Patented Aug. 22, 1950

2,519,361

UNITED STATES PATENT OFFICE 2,519,361

PRODUCTION OF MAGNESIUM CARBONATE OR MAGNESIUM OXIDE CONTAINING LITTLE OR NO CALCIUM

Robert L. Evans, Salt Lake City, Utah, assignor to the United States of America as represented by the Secretary of the Interior No Drawing. Application December 12, 1944, Serial No. 567,880

2 Claims. (Cl. 23—67)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the act of April 30, 1928 (Ch. 460, 45 Stat. L. 467).

This invention relates to the production of relatively pure magnesium compounds from crude magnesite or other magnesium containing materials. More particularly, this invention relates to the production of calcium-free magnesium compounds from magnesite.

Heretofore, hydrated magnesium carbonate has been prepared by calcining magnesite to convert the carbonate present in the crude material to the oxides. Thereafter, an aqueous slurry or dispersion of the calcined material is treated with an excess of carbon dioxide to precipitate calcium as calcium carbonate and to dissolve magnesium forming a solution of magnesium bicarbonate. Thereafter, the magnesium bicarbonate solution is separated from the precipitated calcium carbonate and the recovered solution is then heated or treated by other suitable means to precipitate hydrated magnesium carbonate. While this procedure has been fairly successful in the production of a magnesium compound not requiring a high degree of purity, it is impractical for the production of highly pure magnesium oxide to be used for the production of metallic magnesium, since there always remains a considerable amount of calcium in the magnesium compound recovered, whether it be a hydrated magnesium carbonate or whether it be calcined subsequently to yield magnesium oxide. It has now been found that a practically calcium-free magnesium solution can be prepared when an additional carbonate-forming compound of calcium is incorporated with the crude slurry of calcined magnesite undergoing carbonation. By the incorporation of additional carbonate-forming compound of calcium, generally in the form of a slightly soluble carbonate-forming compound of calcium such as calcium oxide or calcium hydrate, and preferably in the form of calcined dolomite, it has been found that all of the calcium is quickly converted to insoluble calcium carbonate and is thus removed from solution.

By the incorporation of an excess of calcium oxide during the saturation with carbon dioxide gas, the concentration of dissolved calcium in solution quickly falls to an extremely low figure within 30 minutes and at the end of 90 minutes of carbonation the solution is substantially free of dissolved calcium while it is substantially saturated with dissolved magnesium in the form of magnesium bicarbonate.

When only the ordinarily occurring undesired slight amount of calcium is present, introduced in the form of an impurity present in the calcined magnesite, the concentration of dissolved calcium quickly rises in about 20 minutes to a relatively constant figure and remains there as a constant impurity in solution without appreciable change in concentration.

While I do not wish to be bound by any theory of reaction it may be that calcium occurs in solution as an undesired impurity in the form of the soluble bicarbonate of calcium. The presence of a large excess of a normally solid carbonate-forming compound of calcium such as for example quick lime, calcium hydrate, or dolomite assists the reaction whereby calcium bicarbonate is converted to the solid, relatively insoluble calcium carbonate. It has been found, regardless of any theoretical hypothesis on which the reaction may be predicated that by the practice of the present invention, the concentration of undesired dissolved calcium in the magnesium-bearing solution is quickly reduced to less than one part per one hundred thousand parts of solution. The following illustrative examples show how the invention may be carried out, but it is not limited thereto. Parts and percentage compositions are by weight unless otherwise designated and the temperatures are on the centigrade scale:

Example 1

Magnesite was calcined at 700 degrees centigrade and thereafter 10 parts of the resulting calcine were ground to minus 65-mesh and admixed with an excess of water. This mixture was then allowed to stand over night to permit hydration of the calcined magnesite and then mixed with 0.5 part of dolomite previously calcined at 800 degrees centigrade and the entire mixture diluted to make 500 parts of water. Thereupon, the solution is saturated by bubbling carbon dioxide through it. After carbonation for 45 minutes, 6.8 parts of magnesium oxide were dissolved and 0.4 part of calcium oxide remained in solution while after 90 minutes of carbonation a total of 7.4 parts of magnesium oxide had dissolved in the form of the bicarbonate, and only a trace of calcium remained in solution.

Example 2

An excess of magnesite was calcined at 700 degrees centigrade and thereafter ten parts of the calcine was comminuted to pass through a 65-mesh standard Tyler screen. The comminuted magnesite was then mixed with 0.2 part of dolomite similarly calcined at 800 degrees centigrade and comminuted to pass through a 65-mesh standard Tyler screen. The mixture was incorporated with 500 parts of water and placed in a suitable vessel provided with suitable means for bubbling carbon dioxide into the solution. After 90 minutes of carbonation, the solution contained 7.4 parts dissolved magnesium oxide in the form of the bicarbonate, and only a trace of calcium.

While the foregoing examples illustrate the use of hydrated and unhydrated forms of calcined magnesite and calcined dolomite as an additional source of calcium, the invention is not restricted thereto since calcined magnesite can be employed in either the hydrated or unhydrated form and the additional compound of calcium for incorporation with the carbonation liquor can be either hydrated or unhydrated forms of calcium oxide, calcined dolomite and other suitable carbonate-forming compounds of calcium which are preferably added in the solid phase.

While the invention has been particularly described in connection with the production of pure magnesium oxide or magnesium carbonate, it is applicable as well to the removal of calcium from other materials containing magnesium hydroxide or magnesium hydrate.

The magnesium bicarbonate solution produced in accordance with this invention can be separated from the precipitated compounds produced by the carbonation treatment, as by filtration or the like, and thereafter the magnesium bicarbonate solution can be heated to an elevated temperature, for example to the boiling point, to precipitate the insoluble magnesium carbonate, hydrated magnesium carbonate and other insoluble magnesium compounds. Whatever the desired production, whether it can be subsequently calcined after separation from solution as by filtration or decantation to yield a pure form of magnesium oxide containing substantially no calcium.

If desired, the magnesium bicarbonate solution can be saturated with gaseous hydrogen sulfide before or after separating the carbonation residues to precipitate all heavy metals and substantially all of the iron which may be present. Thereafter, the purified magnesium bicarbonate solution can be filtered or decanted, heated to an elevated temperature or aerated, again filtered, and the residue calcined to yield chemically pure magnesium oxide.

Although the invention is broadly applicable to the production of a pure magnesium compound, such as magnesium carbonate, magnesium bicarbonate and magnesium oxide from crude solutions of magnesium containing calcium as an impurity, it has been found that generally speaking from 0.01 to 1.0 part by weight of added calcium per part by weight of calcined magesite is a desirable range of proportion for the additional calcium incorporated in the carbonation mixture. However, it is preferable to employ a more restricted addition of calcium and it has been found that from 0.02 to 0.2 part by weight of calcium per part by weight of magnesium oxide in the form of an insoluble carbonate-forming compound thereof, gives superior results.

Since many apparently widely different embodiments will occur to one skilled in the art, it will be apparent that various changes can be made without departing from the spirit and scope of the invention.

What is claimed is:

1. In a process for the production of a purified magnesium compound involving the carbonation of an aqueous slurry of calcined magnsite containing small amounts of lime as an impurity, and the separation of a magnesium bicarbonate solution, the improvement which comprises adding an excess of lime to the slurry undergoing carbonation, whereby substantially all of the calcium is precipitated from solution.

2. The process of claim 1, wherein the lime is added in the form of calcined dolomite.

ROBERT L. EVANS.

REFERENCES CITED

The following references are of record in the file of this patent:

UNITED STATES PATENTS

| Number | Name | Date |
|---|---|---|
| 734,030 | Young | July 21, 1903 |
| 1,101,772 | Young | June 30, 1914 |
| 2,276,245 | Clarke | Mar. 10, 1942 |